United States Patent
Fukuda et al.

(10) Patent No.: US 10,804,835 B2
(45) Date of Patent: Oct. 13, 2020

(54) INVERTER DEVICE, AIR CONDITIONER, AND GROUND CONNECTION METHOD OF INVERTER DEVICE

(71) Applicant: Hitachi-Johnson Controls Air Conditioning, Inc., Tokyo (JP)

(72) Inventors: Shinya Fukuda, Tokyo (JP); Takashi Oishi, Tokyo (JP); Toru Nakai, Tokyo (JP)

(73) Assignee: HITACHI-JOHNSON CONTROLS AIR CONDITIONING, INC., Tokyo (JP)

(*) Notice: Subject to any disclaimer, the term of this patent is extended or adjusted under 35 U.S.C. 154(b) by 163 days.

(21) Appl. No.: 16/099,501

(22) PCT Filed: Apr. 27, 2018

(86) PCT No.: PCT/JP2018/017350
§ 371 (c)(1),
(2) Date: Nov. 7, 2018

(87) PCT Pub. No.: WO2019/207809
PCT Pub. Date: Oct. 31, 2019

(65) Prior Publication Data
US 2020/0235693 A1  Jul. 23, 2020

(51) Int. Cl.
*H02M 7/493* (2007.01)
*H02P 27/06* (2006.01)
*H02P 29/024* (2016.01)
*F25B 49/02* (2006.01)

(52) U.S. Cl.
CPC .......... *H02P 29/027* (2013.01); *F25B 49/025* (2013.01); *H02P 27/06* (2013.01)

(58) Field of Classification Search
USPC ......................................................... 318/280
See application file for complete search history.

(56) References Cited

U.S. PATENT DOCUMENTS

| | | | | |
|---|---|---|---|---|
| 5,729,096 A | * | 3/1998 | Liu | H05B 41/2985 315/225 |
| 2013/0169048 A1 | | 7/2013 | Yasuda et al. | |
| 2013/0271056 A1 | * | 10/2013 | Bunte | F03D 7/0224 315/503 |
| 2018/0159703 A1 | * | 6/2018 | Chattopadhyay | H04L 25/0286 |

FOREIGN PATENT DOCUMENTS

| | | |
|---|---|---|
| JP | 11-149903 A | 6/1999 |
| JP | 2013-138552 A | 7/2013 |
| JP | 2015-017734 A | 1/2015 |
| JP | 2017-211143 A | 11/2017 |

* cited by examiner

*Primary Examiner* — Bentsu Ro
(74) *Attorney, Agent, or Firm* — Mattingly & Malur, PC

(57) ABSTRACT

A controller controls a first inverter drive circuit and a second inverter drive circuit. The first inverter drive circuit drives a load having a load current larger than the second inverter drive circuit. The first inverter drive circuit includes a control ground terminal and a drive ground terminal which are isolated from each other. The ground terminal of the second inverter drive circuit is connected to the ground of the controller. The control ground terminal of the first inverter drive circuit is connected to the ground of the controller. The drive ground terminal of the first inverter drive circuit is connected to the negative side of the first inverter circuit.

14 Claims, 6 Drawing Sheets

INVERTER DEVICE, AIR CONDITIONER, AND GROUND CONNECTION METHOD OF INVERTER DEVICE

TECHNICAL FIELD

The present invention relates to an inverter device capable of driving a plurality of loads, an air conditioner, and a ground connection method of an inverter device.

BACKGROUND ART

Patent Literature 1 discloses an air conditioner in which one microcomputer drives a compressor, and another microcomputer drives a fan.

CITATION LIST

Patent Document

Patent Document 1: JP-A-11-149903

DISCLOSURE OF THE INVENTION

Problems to be Solved by the Invention

However, when one microcomputer drives a plurality of loads having different load currents, a potential difference is generated between the ground of an inverter drive circuit to drive one of the plurality of loads and the ground of an inverter drive circuit to drive another of the plurality of loads. When the ground of an inverter drive circuit having a large load current is connected to the ground for the microcomputer, a potential difference of approximately 2 V is generated between the ground of the inverter drive circuit having a large load current and the ground of an inverter drive circuit having a small load current. Accordingly, noise was sometimes generated in the current path between these grounds, with the result that the overcurrent detection circuit on the small load side was subject to malfunction.

The present invention has been achieved in consideration of the above-described circumstance. An object of the present invention is to provide an inverter device which can reduce a potential difference to be generated between the grounds of inverter drive circuits, an air conditioner, and a ground connection method of an inverter device.

Solutions to the Problems

For achieving the above-described object, an inverter device according to a first viewpoint includes: N (N is an integer of 2 or more) inverter circuits to drive each of N loads; N inverter drive circuits to control switching of each of the inverter circuits; and a controller to control the N inverter drive circuits based on currents each flowing through the inverter circuits, in which M (M is an integer of 1 or more and N−1 or less) inverter drive circuits of the N inverter drive circuits drive a load having a load current larger than the remaining N−M inverter drive circuits, each of the M inverter drive circuits includes a control ground terminal and a drive ground terminal which are isolated from each other, a ground terminal of at least one inverter drive circuit of the N−M inverter drive circuits is connected to a ground of the controller, and the control ground terminal is connected to the ground of the controller.

Effects of the Invention

According to the present invention, a potential difference generated between the grounds of the inverter drive circuits can be reduced.

DESCRIPTION OF PREFERRED EMBODIMENTS

Embodiments will be described with reference to the drawings. It is noted that the embodiments described below do not limit the invention according to the claims. Also, all of the elements and the combinations of the elements described in the embodiments are not necessarily essential to the solutions of the present invention.

Figure 1:
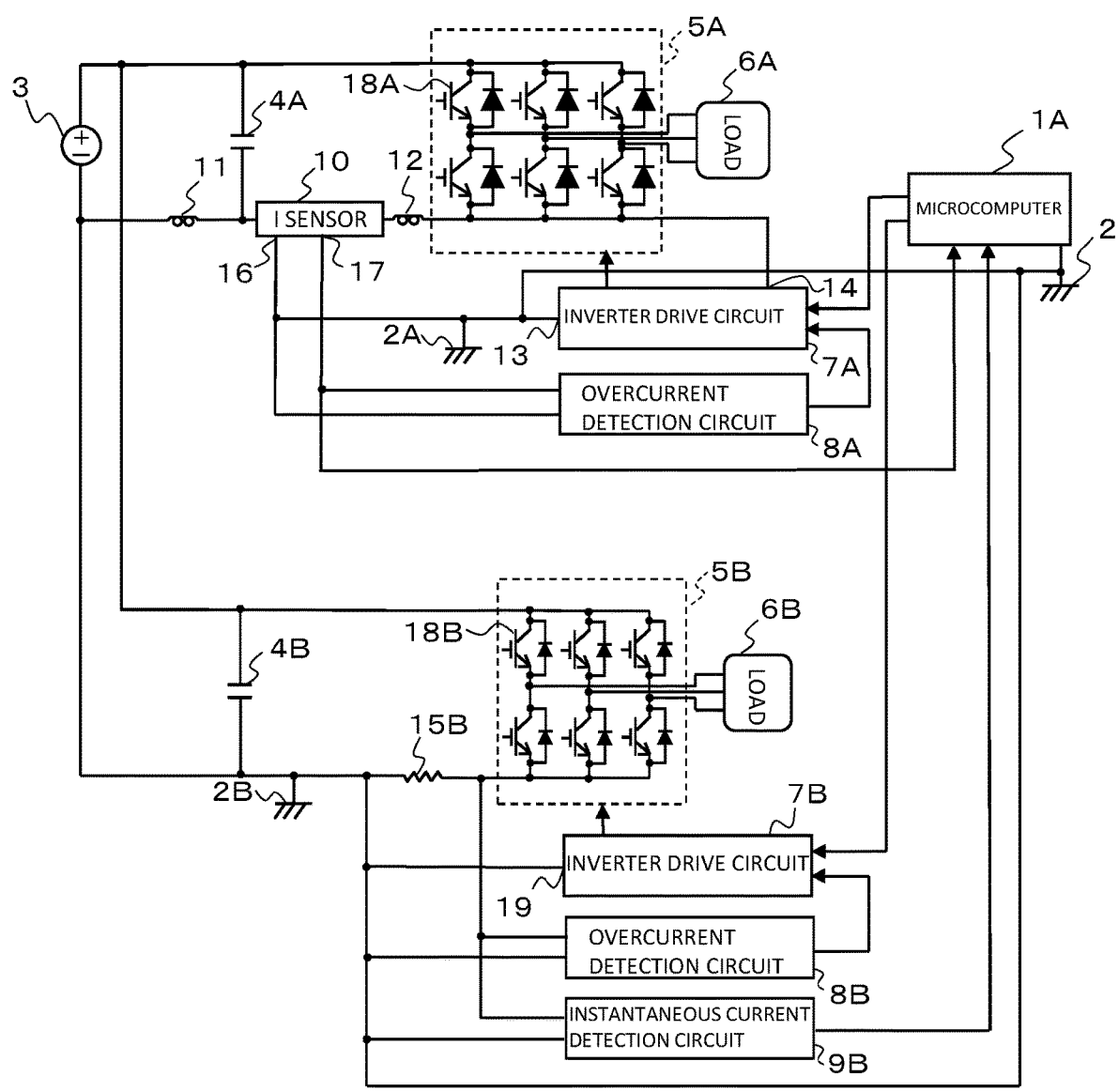
FIG. 1 is a diagram illustrating a circuit configuration of an inverter device according to a first embodiment.

FIG. 1 is a diagram illustrating a circuit configuration of an inverter device according to a first embodiment.

In FIG. 1, the inverter device includes inverter circuits 5A and 5B, inverter drive circuits 7A and 7B, a microcomputer 1A, a current sensor 10, a shunt resistance 15B, overcurrent detection circuits 8A and 8B, and an instantaneous current detection circuit 9B.

A DC power source 3 is connected between the positive electrode and the negative electrode of each of the inverter circuits 5A and 5B. The DC power source 3 may be a converter to convert alternating current into direct current, or may be a battery to generate direct current. Also, a capacitor 4A is connected closer to the DC power source 3 than the current sensor 10 between the positive electrode and the negative electrode of the inverter circuit 5A. A capacitor 4B is connected closer to the DC power source 3 than the shunt resistance 15B between the positive electrode and the negative electrode of the inverter circuit 5B. The capacitors 4A and 4B can be used as a snubber capacitor to suppress switching surges. The current sensor 10 is disposed in the current path on the negative side of the inverter circuit 5A. The shunt resistance 15B is disposed in the current path on the negative side of the inverter circuit 5B. The inverter circuit 5A is connected to a load 6A. The inverter circuit 5B is connected to a load 6B. The load current of the load 6A is larger than the load current of the load 6B.

Parasitic inductances 11 and 12 exist in the current path on the negative side of the inverter circuit 5A. These parasitic inductances 11 and 12 exist in the current sensor 10, the substrate pattern of the inverter circuit 5A, or the like.

The inverter circuit 5A drives the load 6A. In the example of FIG. 1, a 6-arm configuration containing three upper arms and three lower arms is illustrated as the inverter circuit 5A.

Each arm of the inverter circuit 5A includes a switching element 18A, and a reflux diode is connected to each switching element 18A.

The inverter circuit 5B drives the load 6B. In the example of FIG. 1, a 6-arm configuration containing three upper arms and three lower arms is illustrated as the inverter circuit 5B. Each arm of the inverter circuit 5B includes a switching element 18B, and a reflux diode is connected to each switching element 18B.

The switching elements 18A and 18B may be an insulated gate bipolar transistor (IGBT), a bipolar transistor, or a metal-oxide-semiconductor field-effect transistor (MOSFET).

The inverter drive circuit 7A controls the switching of the inverter circuit 5A. The inverter drive circuit 7A includes a control ground terminal 13 and a drive ground terminal 14. The control ground terminal 13 and the drive ground terminal 14 are isolated from each other. A ground 2A of the inverter drive circuit 7A is connected with a ground 2B of the inverter drive circuit 7B, and also connected with a path insulated from the current path on the negative side of the inverter circuit 5A. The control ground terminal 13 is connected to the ground 2A of the inverter drive circuit 7A and a ground 2 of the microcomputer 1A. The drive ground terminal 14 is connected to a point that is on the negative side of the inverter circuit 5A and is not on a current path L1 of FIG. 2. The negative side of the inverter circuit 5A can be connected to an emitter of the switching element 18A used in the lower arm of the inverter circuit 5A. A potential difference V2 between the control ground terminal 13 and the drive ground terminal 14 can have a tolerance of 20 V or more.

The inverter drive circuit 7B controls the switching of the inverter circuit 5B. The inverter drive circuit 7B includes a ground terminal 19. The ground terminal 19 is connected to the ground 2B of the inverter drive circuit 7B and the ground 2 of the microcomputer 1A. The negative side of the inverter circuit 5B can be connected to an emitter of the switching element 18B used in the lower arm of the inverter circuit 5B.

The microcomputer 1A controls the inverter drive circuit 7A based on a current flowing through the inverter circuit 5A, and the inverter drive circuit 7B based on a current flowing through the inverter circuit 5B. The microcomputer 1A can be used as a controller to control the inverter drive circuits 7A and 7B. The controller may be a semiconductor computing element such as a digital signal processor. Here, the ground 2A of the inverter drive circuit 7A and the ground 2B of the inverter drive circuit 7B are connected to the ground 2 of the microcomputer 1A through a path that does not contain the current path on the negative side of the inverter circuit 5A.

The current sensor 10 is insulated from the negative side of the inverter circuit 5A and detects a current flowing through the negative side of the inverter circuit 5A. The current sensor 10 includes a ground terminal 16 and an output terminal 17. The ground terminal 16 is connected to the ground 2A of the inverter drive circuit 7A. The output terminal 17 is a terminal to output the current value detected by the current sensor 10. The output terminal 17 is connected to the microcomputer 1A and the overcurrent detection circuit 8A. The current sensor 10 may be a Hall element sensor, or may be a current detection transformer. From the viewpoint of the downsizing of the current sensor 10, a Hall element sensor is preferably used.

The shunt resistance 15B detects a current flowing through the negative side of the inverter circuit 5B. The shunt resistance 15B can be connected between the negative electrode of the inverter circuit 5B and the ground 2B of the inverter drive circuit 7B. At this time, the ground 2B of the inverter drive circuit 7B can be disposed near the shunt resistance 15B.

The overcurrent detection circuit 8A detects an overcurrent flowing through the inverter circuit 5A based on the current value detected by the current sensor 10. The ground terminal of the overcurrent detection circuit 8A is connected to the ground 2A of the inverter drive circuit 7A. The overcurrent detection circuit 8B detects an overcurrent flowing through the inverter circuit 5B based on the current value detected by the shunt resistance 15B. The instantaneous current detection circuit 9B detects an instantaneous current flowing through the inverter circuit 5B based on the current value detected by the shunt resistance 15B. The ground terminals of the overcurrent detection circuit 8B and the instantaneous current detection circuit 9B are connected to the ground 2B of the inverter drive circuit 7B.

Then, the DC voltage from the DC power source 3 is applied between the positive electrode and the negative electrode of each of the inverter circuits 5A and 5B. At this time, the inverter drive circuit 7A controls the switching of the inverter circuit 5A based on a command from the microcomputer 1A, thereby to convert the DC voltage from the DC power source 3 into AC voltage to control a load current flowing through the load 6A. When the load 6A is a motor, the inverter drive circuit 7A changes the frequency and voltage of the AC voltage generated in the inverter circuit 5A, so that the rotational speed of the motor can be changed.

A current flowing through the negative side of the inverter circuit 5A is detected by the current sensor 10. The current value detected by the current sensor 10 is input to the microcomputer 1A and the overcurrent detection circuit 8A. The microcomputer 1A monitors the action of the inverter circuit 5A based on the current value detected by the current sensor 10. Then, the microcomputer 1A controls the inverter drive circuit 7A such that the inverter circuit 5A acts according to the command value. Also, when the overcurrent detection circuit 8A detects an overcurrent of the inverter circuit 5A, it shuts down the inverter drive circuit 7A.

Also, the inverter drive circuit 7B controls the switching of the inverter circuit 5B based on a command from the microcomputer 1A, thereby to convert the DC voltage from the DC power source 3 into AC voltage to control a load current flowing through the load 6B. When the load 6B is a motor, the inverter drive circuit 7B changes the frequency and voltage of the AC voltage generated in the inverter circuit 5B, so that the rotational speed of the motor can be changed.

A current flowing through the negative side of the inverter circuit 5B is detected by the shunt resistance 15B. The current value detected by the shunt resistance 15B is input to the instantaneous current detection circuit 9B and the overcurrent detection circuit 8B. The instantaneous current detection circuit 9B amplifies the current value detected by the shunt resistance 15B thereby to detect the instantaneous current of the inverter circuit 5B, and outputs the detected instantaneous current to the microcomputer 1A. The microcomputer 1A monitors the action of the inverter circuit 5B based on the instantaneous current of the inverter circuit 5B. Then, the microcomputer 1A controls the inverter drive circuit 7B such that the inverter circuit 5B acts according to the command value. Also, when the overcurrent detection circuit 8B detects an overcurrent of the inverter circuit 5B, it shuts down the inverter circuit 5B.

Figure 2:
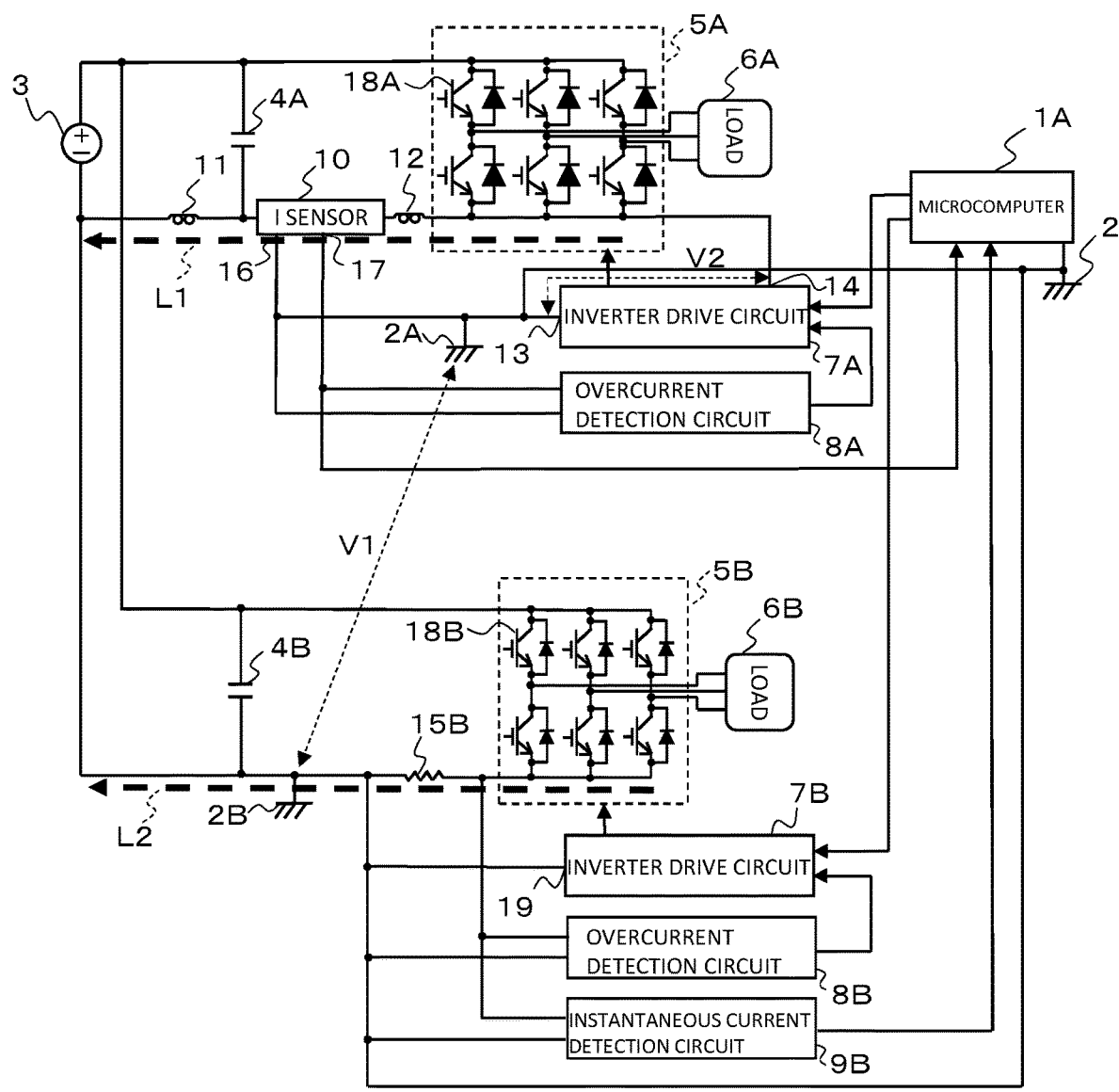
FIG. 2 is a diagram illustrating a current path L1 on the negative side of an inverter circuit 5A and a current path L2 on the negative side of an inverter circuit 5B of FIG. 1.

FIG. 2 is a diagram illustrating a current path L1 on the negative side of the inverter circuit 5A and a current path L2 on the negative side of the inverter circuit 5B of FIG. 1.

In FIG. 2, a current corresponding to the load current of the load 6A flows through the current path L1 on the negative side of the inverter circuit 5A. At this time, the potential difference of the current path L1 is given by (current change amount of current path L1)×(inductance value of parasitic inductances 11 and 12), and sometimes becomes approximately 2 V.

Here, since the current sensor 10 is insulated from the negative side of the inverter circuit 5A, the ground 2A of the inverter drive circuit 7A can be isolated from the current path L1. Consequently, the potential of the ground 2A of the inverter drive circuit 7A is not affected by the potential difference of the current path L1.

Meanwhile, a current corresponding to the load current of the load 6B flows through the current path L2 on the negative side of the inverter circuit 5B. The load current of the load 6B of the inverter circuit 5B is smaller than the load current of the load 6A of the inverter circuit 5A. Therefore, the current flowing through the current path L2 on the negative side of the inverter circuit 5B is small, and the potential difference of the current path L2 is negligibly small. Thus, even when the ground 2B of the inverter drive circuit 7B is connected to the current path L2, the potential of the ground 2B of the inverter drive circuit 7B is not affected by the potential difference of the current path L2.

As a result, a potential difference V1 between the ground 2A of the inverter drive circuit 7A and the ground 2B of the inverter drive circuit 7B can be decreased, and noise generated in the path between the ground 2A of the inverter drive circuit 7A and the ground 2B of the inverter drive circuit 7B can be reduced. Consequently, the current detection error of the overcurrent detection circuit 8B can be suppressed low, and the malfunction of the overcurrent detection circuit 8B can be prevented.

At this time, a potential difference of approximately 20 V is sometimes generated between the control ground terminal 13 and the drive ground terminal 14 of the inverter drive circuit 7A. Here, when the control ground terminal 13 and the drive ground terminal 14 are isolated from each other, the inverter circuit 5A can be switched, and the malfunction of the inverter circuit 5A can be prevented, even if a potential difference of approximately 20 V is generated between the control ground terminal 13 and the drive ground terminal 14. Also, when the potential difference V2 between the control ground terminal 13 and the drive ground terminal 14 of the inverter drive circuit 7A has a tolerance of 20 V or more, the breakage of the inverter drive circuit 7A can be prevented.

Figure 3:
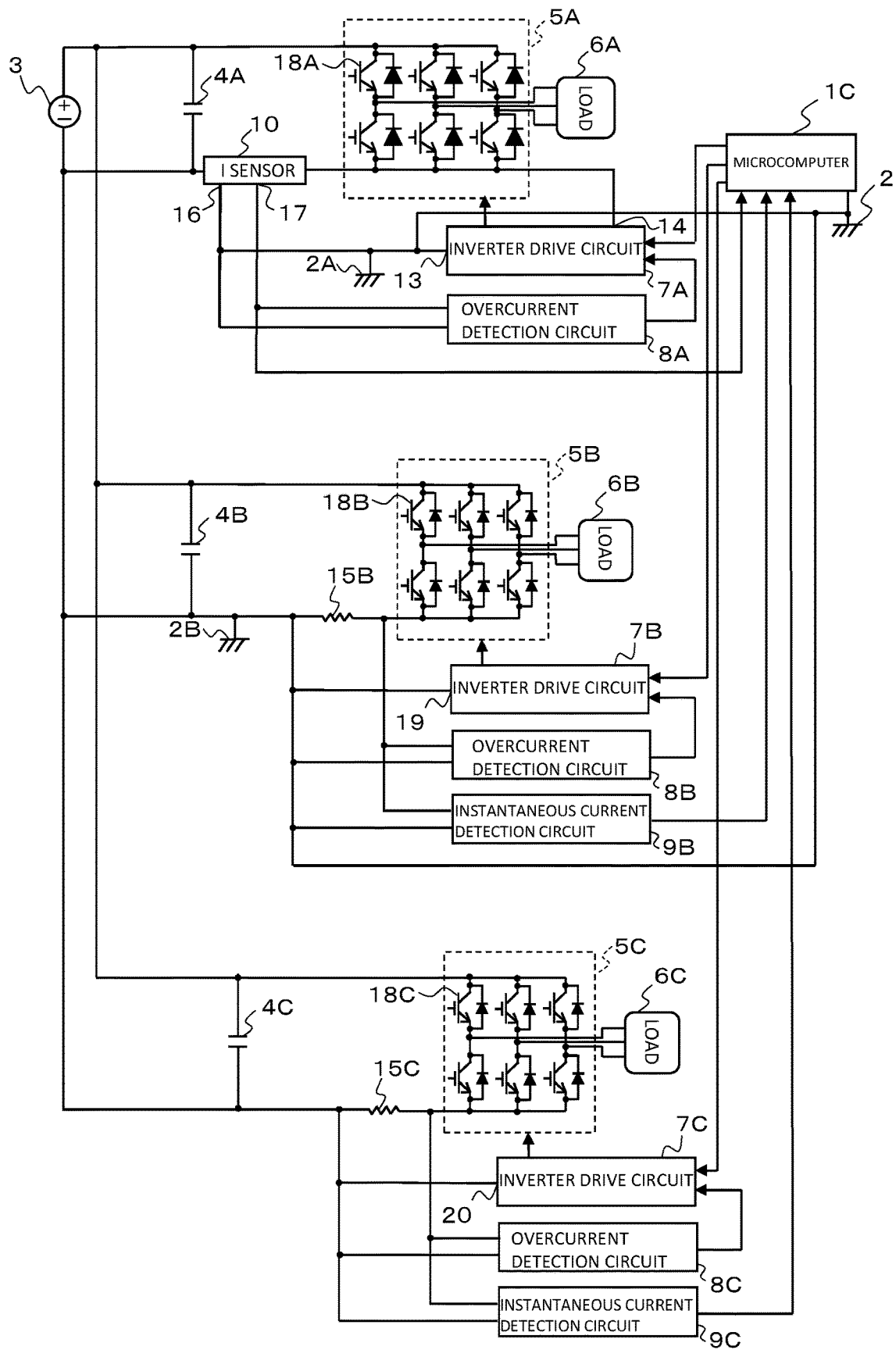
FIG. 3 is a diagram illustrating a circuit configuration of an inverter device according to a second embodiment.

FIG. 3 is a diagram illustrating a circuit configuration of an inverter device according to a second embodiment.

In the inverter device of FIG. 1, one microcomputer 1A drives two loads 6A and 6B. However, in the inverter device of FIG. 3, one microcomputer 1C drives three loads 6A, 6B, and 6C. The load current of each of the loads 6B and 6C is smaller than the load current of the load 6A.

The inverter device of FIG. 3 includes an inverter circuit 5C, an inverter drive circuit 7C, a shunt resistance 15C, an overcurrent detection circuit 8C, and an instantaneous current detection circuit 9C, in addition to the inverter device of FIG. 1. Also, the inverter device of FIG. 3 includes a microcomputer 1C instead of the microcomputer 1A of FIG. 1. The DC power source 3 is connected between the positive electrode and the negative electrode of the inverter circuit 5C. Also, a capacitor 4C is connected between the positive electrode and the negative electrode of the inverter circuit 5C, closer to the DC power source 3 than the shunt resistance 15C. The shunt resistance 15C is disposed in the current path on the negative side of the inverter circuit 5C. The inverter circuit 5C is connected to the load 6C.

The inverter circuit 5C drives the load 6C. In the example of FIG. 3, a 6-arm configuration containing three upper arms and three lower arms is illustrated as the inverter circuit 5C. Each arm of the inverter circuit 5C includes a switching element 18C, and a reflux diode is connected to each switching element 18C.

The inverter drive circuit 7C controls the switching of the inverter circuit 5C. The inverter drive circuit 7C includes a ground terminal 20. The ground terminal 20 is connected to the ground 2B of the inverter drive circuit 7B. The negative side of the inverter circuit 5C can be connected to an emitter of the switching element 18C used in the lower arm of the inverter circuit 5C.

The microcomputer 1C controls the inverter drive circuit 7A based on a current flowing through the inverter circuit 5A, the inverter drive circuit 7B based on a current flowing through the inverter circuit 5B, and the inverter drive circuit 7C based on a current flowing through the inverter circuit 5C. The microcomputer 1C can be used as a controller to control the inverter drive circuits 7A, 7B, and 7C.

The shunt resistance 15C detects a current flowing through the negative side of the inverter circuit 5C. The shunt resistance 15C can be connected to the current path on the negative side of the inverter circuit 5C. The overcurrent detection circuit 8C detects an overcurrent flowing through the inverter circuit 5C based on the current value detected by the shunt resistance 15C. The instantaneous current detection circuit 9C detects an instantaneous current flowing through the inverter circuit 5C based on the current value detected by the shunt resistance 15C.

Then, the DC voltage from the DC power source 3 is applied between the positive electrode and the negative electrode of each of the inverter circuits 5A, 5B, and 5C. At this time, the inverter drive circuit 7C controls the switching of the inverter circuit 5C based on a command from the microcomputer 1C, thereby to convert the DC voltage from the DC power source 3 into AC voltage to control a load current flowing through the load 6C.

A current flowing through the negative side of the inverter circuit 5C is detected by the shunt resistance 15C. The current value detected by the shunt resistance 15C is input to the instantaneous current detection circuit 9C and the overcurrent detection circuit 8C. The instantaneous current detection circuit 9C amplifies the current value detected by the shunt resistance 15C thereby to detect an instantaneous current of the inverter circuit 5C, and outputs the detected instantaneous current to the microcomputer 1C. The microcomputer 1C monitors the action of the inverter circuit 5C based on the instantaneous current of the inverter circuit 5C. Then, the microcomputer 1C controls the inverter drive circuit 7C such that the inverter circuit 5C acts according to the command value. Also, when the overcurrent detection circuit 8C detects an overcurrent of the inverter circuit 5C, it shuts down the inverter circuit 5C.

A current corresponding to the load current of the load 6C flows through the current path on the negative side of the inverter circuit 5C. The load current of the load 6C of the inverter circuit 5C is smaller than the load current of the load 6A of the inverter circuit 5A. Accordingly, the current flowing through the current path on the negative side of the inverter circuit 5C is small, and the potential difference of the current path is negligibly small. Thus, even when the ground terminal 20 of the inverter drive circuit 7C is connected to the ground 2B of the inverter drive circuit 7B, the potential of the ground 2B of the inverter drive circuit 7B is not affected by the potential difference of the current path on the negative side of the inverter circuit 5C.

Therefore, while the potential difference between the ground 2B of the inverter drive circuit 7B and the ground terminal 20 of the inverter drive circuit 7C is decreased, the potential difference between the ground 2A of the inverter drive circuit 7A and the ground terminal 20 of the inverter drive circuit 7C can be decreased. As a result, while noise generated in the path between the ground 2A of the inverter drive circuit 7A and the ground 2B of the inverter drive circuit 7B is reduced, noise generated in the path between the ground 2A of the inverter drive circuit 7A and the ground terminal 20 of the inverter drive circuit 7C can be reduced. Accordingly, even when one microcomputer 1C drives three loads 6A, 6B, and 6C, the current detection error of the overcurrent detection circuits 8B and 8C can be suppressed low, and the malfunction of the overcurrent detection circuits 8B and 8C can be prevented.

Figure 4:
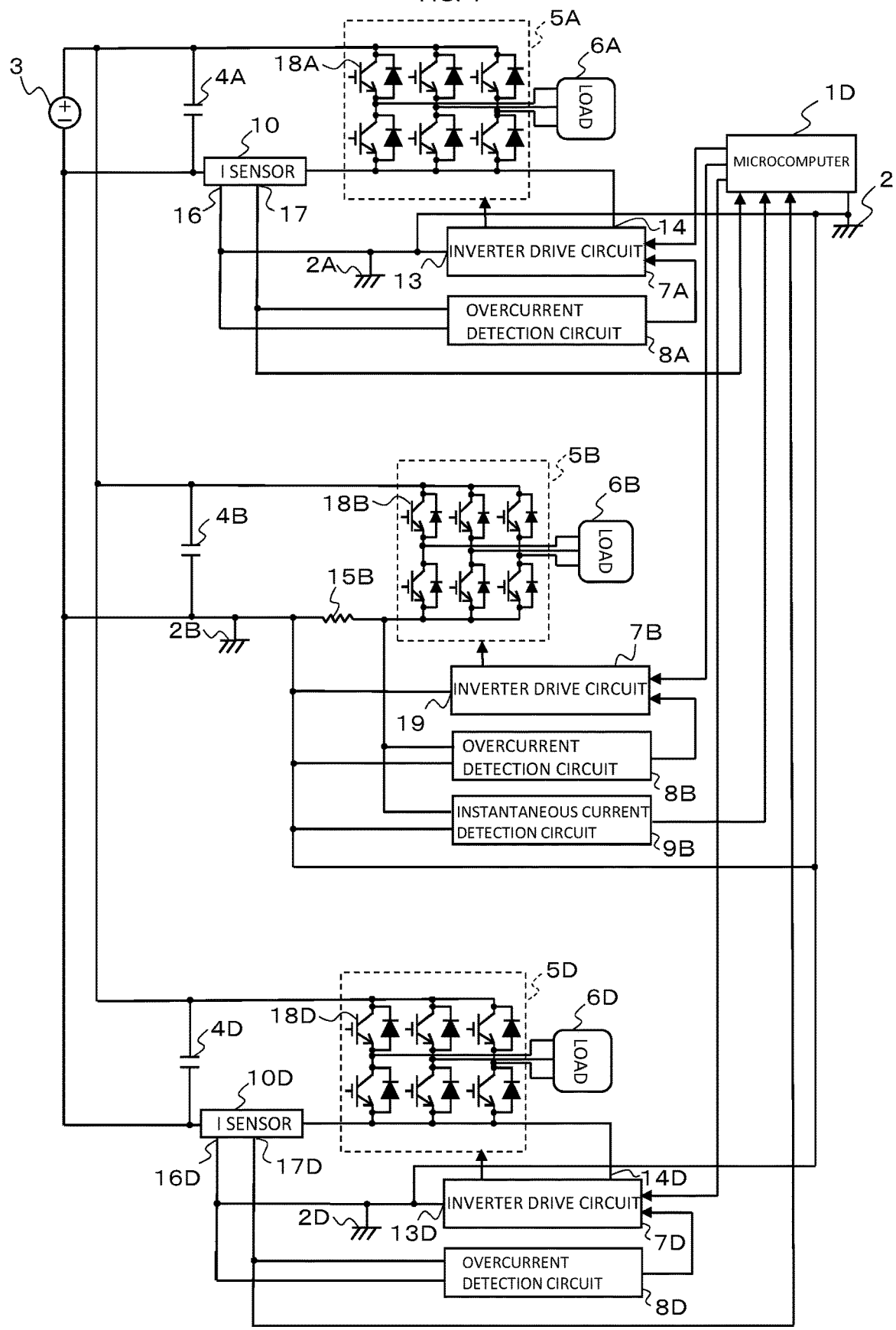
FIG. 4 is a diagram illustrating a circuit configuration of an inverter device according to a third embodiment.

FIG. 4 is a diagram illustrating a circuit configuration of an inverter device according to a third embodiment.

In the inverter device of FIG. 4, one microcomputer 1D drives three loads 6A, 6B, and 6D. The load current of each of the loads 6A and 6D is larger than the load current of the load 6B.

The inverter device of FIG. 4 includes an inverter circuit 5D, an inverter drive circuit 7D, a current sensor 10D, and an overcurrent detection circuit 8D, in addition to the inverter device of FIG. 1. Also, the inverter device of FIG. 4 includes a microcomputer 1D instead of the microcomputer 1A of FIG. 1. The DC power source 3 is connected between the positive electrode and the negative electrode of the inverter circuit 5D. Furthermore, a capacitor 4D is connected closer to the DC power source 3 than the current sensor 10D between the positive electrode and the negative electrode of the inverter circuit 5D. The current sensor 10D is disposed in the current path on the negative side of the inverter circuit 5D. The inverter circuit 5D is connected to the load 6D.

The inverter circuit 5D drives the load 6D. In the example of FIG. 4, a 6-arm configuration containing three upper arms and three lower arms is illustrated as the inverter circuit 5D. Each arm of the inverter circuit 5D includes a switching element 18D, and a reflux diode is connected to each switching element 18D.

The inverter drive circuit 7D controls the switching of the inverter circuit 5D. The inverter drive circuit 7D includes a control ground terminal 13D and a drive ground terminal 14D. The control ground terminal 13D and the drive ground terminal 14D are isolated from each other. A ground 2D of the inverter drive circuit 7D is connected to a path different from the current path on the negative side of the inverter circuit 5D. The control ground terminal 13D is connected to the ground 2D of the inverter drive circuit 7D and the ground 2 of the microcomputer 1D. The drive ground terminal 14D is connected to the negative side of the inverter circuit 5D. The negative side of the inverter circuit 5D can be connected to an emitter of the switching element 18D used in the lower arm of the inverter circuit 5D. The potential difference between the control ground terminal 13D and the drive ground terminal 14D can have a tolerance of 20 V or more.

The microcomputer 1D controls the inverter drive circuit 7A based on a current flowing through the inverter circuit 5A, the inverter drive circuit 7B based on a current flowing through the inverter circuit 5B, and the inverter drive circuit 7D based on a current flowing through the inverter circuit 5D. The microcomputer 1D can be used as a controller to control the inverter drive circuits 7A, 7B, and 7D.

The current sensor 10D is insulated from the negative side of the inverter circuit 5D, and detects a current flowing through the negative side of the inverter circuit 5D. The current sensor 10D includes a ground terminal 16D and an output terminal 17D. The ground terminal 16D is connected to the ground 2D of the inverter drive circuit 7D. The output terminal 17D is a terminal to output the current value detected by the current sensor 10D. The output terminal 17D is connected to the microcomputer 1D and the overcurrent detection circuit 8D.

Then, the DC voltage from the DC power source 3 is applied between the positive electrode and the negative electrode of each of the inverter circuits 5A, 5B, and 5D. At this time, the inverter drive circuit 7D controls the switching of the inverter circuit 5D based on a command from the microcomputer 1D, thereby to convert the DC voltage from the DC power source 3 into AC voltage to control a load current flowing through the load 6D.

A current flowing through the negative side of the inverter circuit 5D is detected by the current sensor 10D. The current value detected by the current sensor 10D is input to the microcomputer 1D and the overcurrent detection circuit 8D. The microcomputer 1D monitors the action of the inverter circuit 5D based on the current value detected by the current sensor 10D. Then, the microcomputer 1D controls the inverter drive circuit 7D such that the inverter circuit 5D acts according to the command value. Also, when the overcurrent detection circuit 8D detects an overcurrent of the inverter circuit 5D, it shuts down the inverter circuit 5D.

A current corresponding to the load current of the load 6D flows through the current path on the negative side of the inverter circuit 5D. At this time, the potential difference of the current path on the negative side of the inverter circuit 5D sometimes becomes approximately 2 V. Here, since the current sensor 10D is insulated from the negative side of the inverter circuit 5D, the ground 2D of the inverter drive circuit 7D can be isolated from the current path on the negative side of the inverter circuit 5D. Consequently, the potential of the ground 2D of the inverter drive circuit 7D is not affected by the potential difference of the current path on the negative side of the inverter circuit 5D.

Therefore, while the potential difference between the ground 2A of the inverter drive circuit 7A and the ground 2B of the inverter drive circuit 7B is decreased, the potential difference between the ground 2D of the inverter drive circuit 7D and the ground 2B of the inverter drive circuit 7B can be decreased. As a result, while noise generated in the path between the ground 2A of the inverter drive circuit 7A and the ground 2B of the inverter drive circuit 7B is reduced, noise generated in the path between the ground 2D of the inverter drive circuit 7D and the ground 2B of the inverter drive circuit 7B can be reduced. Accordingly, even when one microcomputer 1D drives three loads 6A, 6B, and 6D, the current detection error of the overcurrent detection circuit 8B can be suppressed low, and the malfunction of the overcurrent detection circuit 8B can be prevented.

It is noted that although a configuration in which one microcomputer drives two or three loads has been described in the above-described embodiments, it can be applied to a case in which one microcomputer drives N (N is an integer of 2 or more) loads. At this time, the load currents of M (M is an integer of 1 or more and N−1 or less) loads of N loads can be larger than the load currents of the remaining N−M loads.

Figure 5:
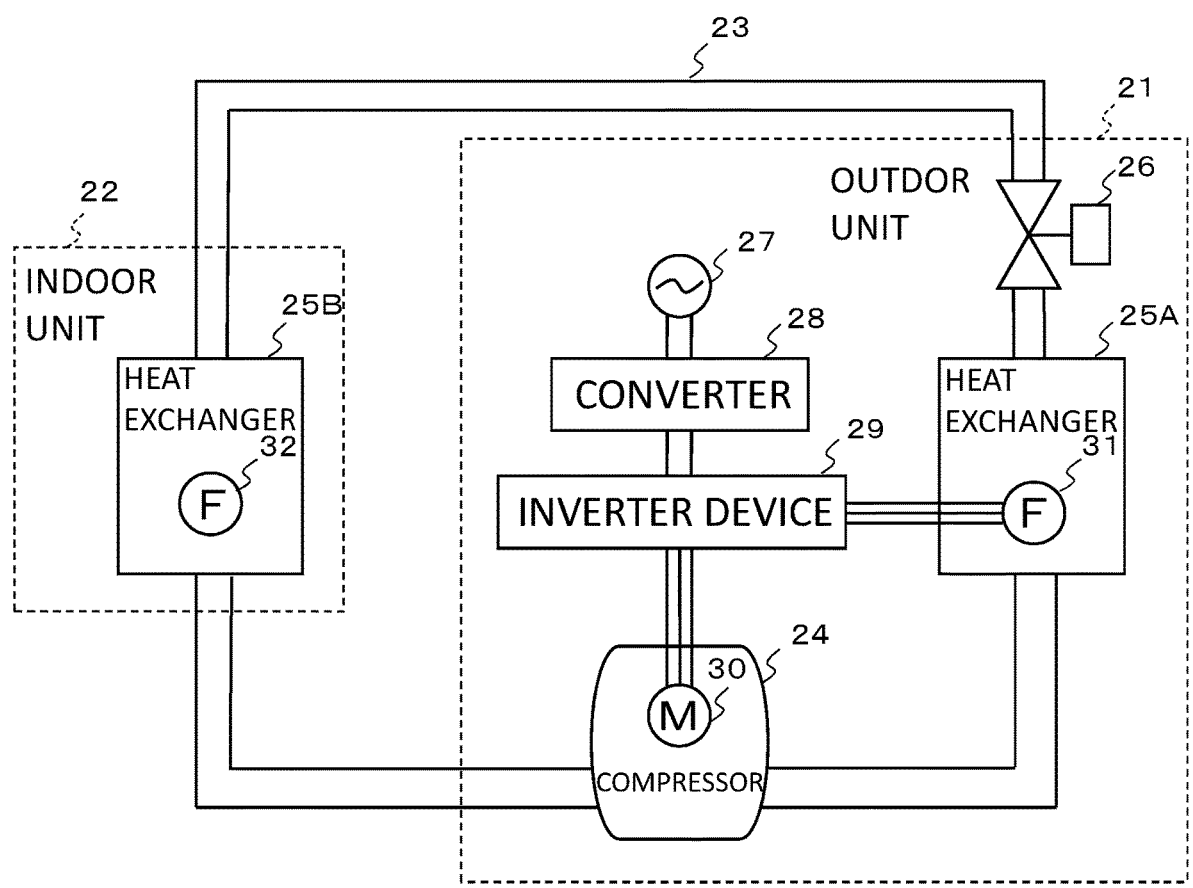
FIG. 5 is a block diagram illustrating a configuration of an air conditioner to which an inverter device according to a fourth embodiment is applied.

FIG. 5 is a block diagram illustrating a configuration of an air conditioner to which an inverter device according to a fourth embodiment is applied.

In FIG. 5, the air conditioner includes an outdoor unit 21 and an indoor unit 22. The outdoor unit 21 and the indoor unit 22 are connected through piping 23. A refrigerant flows through the piping 23.

The outdoor unit 21 includes a compressor 24, a heat exchanger 25A, an expansion valve 26, an AC power source 27, a converter 28, and an inverter device 29. The compressor 24 contains a motor 30. The heat exchanger 25A contains a fan 31. The inverter device 29 can have the configuration of FIG. 1. In that case, the motor 30 of the compressor 24 can serve as the load 6A of FIG. 1, and the fan 31 can serve as the load 6B. The indoor unit 22 includes a heat exchanger 25B. The heat exchanger 25B contains a fan 32.

When the AC voltage from the AC power source 27 is applied to the converter 28, the applied AC voltage is converted into DC voltage, and the DC voltage is applied to the inverter device 29. The inverter device 29 converts the DC voltage from the converter 28 into AC voltage, and drives the motor 30 and the fan 31 based on the AC voltage.

The compressor 24 compresses a refrigerant by the drive of the motor 30. The heat exchanger 25B exchanges heat between the air delivered from the fan 31 and a refrigerant. The expansion valve 26 expands the refrigerant flowing from the heat exchanger 25A or the heat exchanger 24 for decompression. The heat exchanger 25B exchanges heat between the air delivered from the fan 32 and a refrigerant.

It is noted that although an example including the inverter device 29 having the configuration of FIG. 1 is illustrated in the configuration of FIG. 5, the inverter device 29 may have the configuration of FIG. 3. In that case, the motor 30 of the compressor 24 can serve as the load 6A of FIG. 3, the fan 31 as the load 6B, and the fan 32 as the load 6C.

Figure 6:
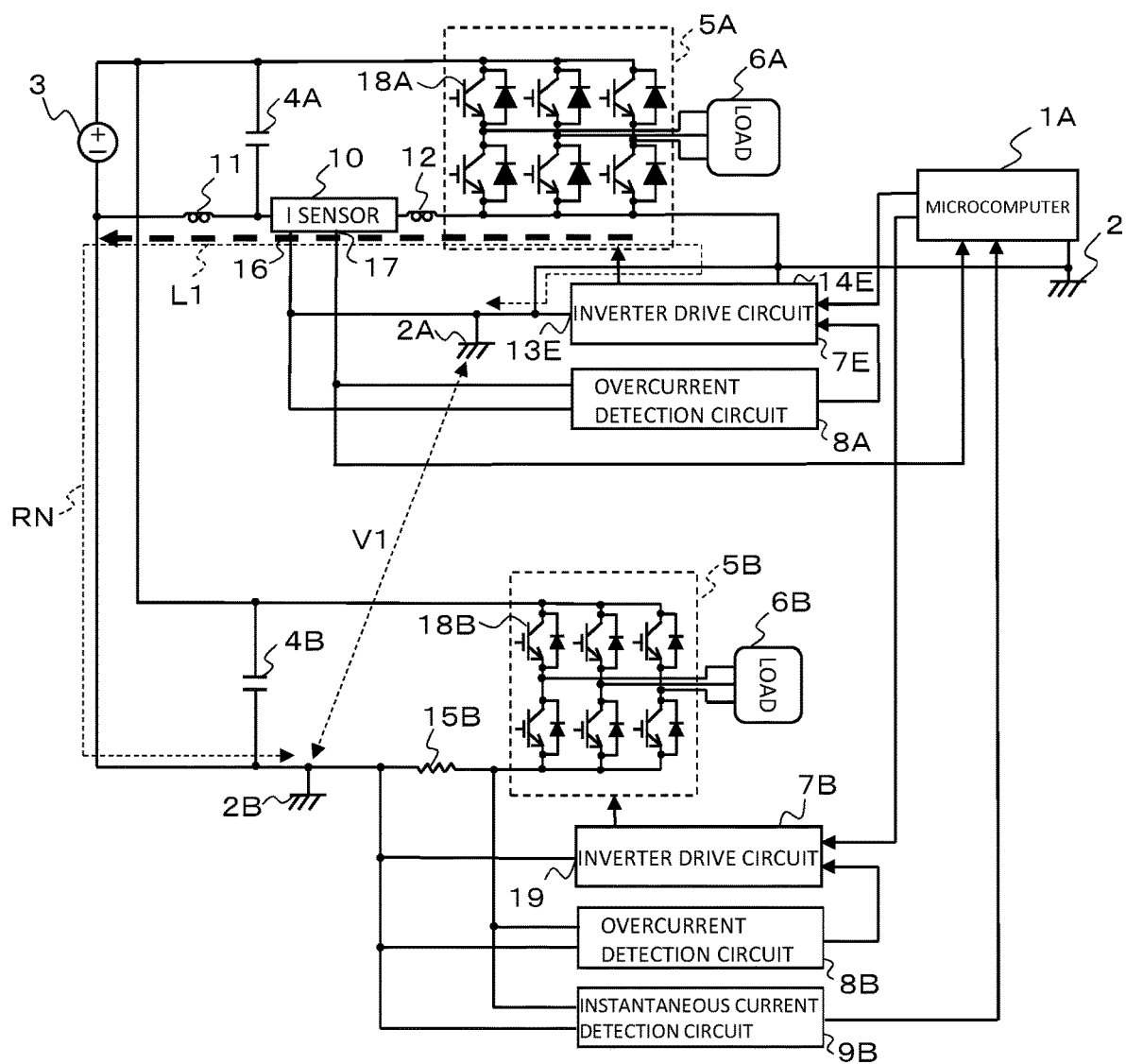
FIG. 6 is a diagram illustrating a circuit configuration of an inverter device according to a comparative example.

FIG. 6 is a diagram illustrating a circuit configuration of an inverter device according to a comparative example.

In the inverter device of FIG. 6, an inverter drive circuit 7E is disposed instead of the inverter drive circuit 7A of FIG. 1. Here, a control ground terminal 13E and a drive ground terminal 14E of the inverter drive circuit 7E is short-circuited. Also, the control ground terminal 13E and the drive ground terminal 14E are connected to the ground 2 of the microcomputer 1A, the ground 2A of the inverter drive circuit 7E, and the negative electrode of the inverter circuit 5A.

At this time, the ground 2 of the microcomputer 1A and the ground 2A of the inverter drive circuit 7E are connected with the ground 2B of the inverter drive circuit 7B through the current path L1 on the negative side of the inverter circuit 5A. Accordingly, when a current flows through the current path L1 on the negative side of the inverter circuit 5A, the potential difference V1 between the ground 2A of the inverter drive circuit 7E and the ground 2B of the inverter drive circuit 7B becomes approximately 2 V. As a result, noise is sometimes generated in a path RN between the ground 2A of the inverter drive circuit 7E and the ground 2B of the inverter drive circuit 7B, thereby causing the malfunction of the overcurrent detection circuit 8B.

DESCRIPTION OF REFERENCE SIGNS 1A, 1C to 1E microcomputer
2, 2A, 2B, 2D ground
3 DC power source
4A to 4D capacitor
5A to 5D inverter circuit
6A to 6D load
7A to 7D inverter drive circuit
8A to 8D overcurrent detection circuit
9, 9B, 9C instantaneous current detection circuit
10, 10D current sensor
13 control ground terminal
14 drive ground terminal
15, 15B, 15C shunt resistance
16, 19, 20 ground terminal
17 output terminal
18A to 18D switching element

The invention claimed is:

1. An inverter device comprising:
N (N is an integer of 2 or more) inverter circuits to drive each of N loads;
N inverter drive circuits to control switching of each of the inverter circuits; and
a controller to control the N inverter drive circuits based on currents each flowing through the inverter circuits, wherein
M (M is an integer of 1 or more and N−1 or less) inverter drive circuits of the N inverter drive circuits drive a load having a load current larger than the remaining N−M inverter drive circuits,
each of the M inverter drive circuits includes a control ground terminal and a drive ground terminal which are isolated from each other,
a ground terminal of at least one inverter drive circuit of the N−M inverter drive circuits is connected to a ground of the controller, and
the control ground terminal is connected to the ground of the controller.

2. The inverter device according to claim 1, wherein the drive ground terminal of each of the M inverter drive circuits is connected to a negative side of the inverter circuit corresponding to each of the inverter drive circuits.

3. The inverter device according to claim 2, wherein the negative side of the inverter circuit corresponding to each of the M inverter drive circuits is connected to an emitter of a switching element used in a lower arm of the inverter circuit.

4. The inverter device according to claim 1, wherein a potential difference between the control ground terminal and the drive ground terminal of each of the M inverter drive circuits has a tolerance of 20 V or more.

5. The inverter device according to claim 1, comprising M current sensors detecting a current flowing through a negative side of the inverter circuit corresponding each of the M inverter drive circuits, wherein
the current sensor is insulated from the negative side of the inverter circuit.

6. The inverter device according to claim 5, comprising M overcurrent detection circuits detecting an overcurrent of each of the M inverter circuits based on a current value detected by the current sensor.

7. The inverter device according to claim 6, comprising N−M shunt resistances detecting a current flowing through a negative side of each of the inverter circuit of the N−M inverter circuits.

8. The inverter device according to claim 7, comprising:
N−M overcurrent detection circuits detecting an overcurrent of each of the N−M inverter circuits based on a current value detected by the shunt resistance; and
an instantaneous current detection circuit to detect an instantaneous value of a current flowing through each of the N−M inverter circuits based on a current value detected by the shunt resistance, wherein
the controller controls the M inverter drive circuits based on current values detected by the current sensors, and
the N–M inverter drive circuits based on an instantaneous value of a current detected by the instantaneous current detection circuit.

9. The inverter device according to claim 1, wherein
the inverter circuits include:
a first inverter circuit; and
a second inverter circuit to drive a load having a load current smaller than a load current of a load driven by the first inverter circuit,
the inverter drive circuits include:
a first inverter drive circuit to control switching of the first inverter circuit;
a second inverter drive circuit to control switching of the second inverter circuit;
a current sensor to detect a current flowing through a negative side of the first inverter circuit; and
a shunt resistance to detect a current flowing through a negative side of the second inverter circuit,
the first inverter drive circuit contains a control ground terminal and a drive ground terminal which are isolated from each other,
the control ground terminal is connected to the ground of the controller,
the drive ground terminal is connected to the negative side of the first inverter circuit,
a ground terminal of the second inverter drive circuit is connected to the ground of the controller, and
the current sensor is isolated from the negative side of the first inverter circuit.

10. The inverter device according to claim 1, wherein
the inverter circuits include:
a first inverter circuit;
a second inverter circuit to drive a load having a load current smaller than a load current of a load driven by the first inverter circuit; and
a third inverter circuit to drive a load having a load current smaller than a load current of a load driven by the first inverter circuit,
the inverter drive circuits include:
a first inverter drive circuit to control switching of the first inverter circuit;
a second inverter drive circuit to control switching of the second inverter circuit;
a third inverter drive circuit to control switching of the third inverter circuit;
a current sensor to detect a current flowing through a negative side of the first inverter circuit;
a first shunt resistance to detect a current flowing through a negative side of the second inverter circuit; and
a second shunt resistance to detect a current flowing through a negative side of the third inverter circuit,
the first inverter drive circuit contains a control ground terminal and a drive ground terminal which are isolated from each other,
the control ground terminal is connected to the ground of the controller,
the drive ground terminal is connected to the negative side of the first inverter circuit,
a ground terminal of the second inverter drive circuit is connected to the ground of the controller,
a ground terminal of the third inverter drive circuit is connected to the ground terminal of the second inverter drive circuit, and
the current sensor is isolated from the negative side of the first inverter circuit.

11. The inverter device according to claim 1, wherein
the inverter circuits include:
a first inverter circuit;
a second inverter circuit to drive a load having a load current larger than a load current of a load driven by the first inverter circuit; and
a third inverter circuit to drive a load having a load current larger than a load current of a load driven by the first inverter circuit,
the inverter drive circuits include:
a first inverter drive circuit to control switching of the first inverter circuit;
a second inverter drive circuit to control switching of the second inverter circuit;
a third inverter drive circuit to control switching of the third inverter circuit;
a first current sensor to detect a current flowing through a negative side of the second inverter circuit;
a second current sensor to detect a current flowing through a negative side of the third inverter circuit; and
a shunt resistance to detect a current flowing through a negative side of the first inverter circuit,
the second inverter drive circuit contains a first control ground terminal and a first drive ground terminal which are isolated from each other,
the third inverter drive circuit contains a second control ground terminal and a second drive ground terminal which are isolated from each other,
the first control ground terminal and the second control ground terminal are connected to the ground of the controller,
the first drive ground terminal is connected to the negative side of the second inverter circuit,
the second drive ground terminal is connected to the negative side of the third inverter circuit,
a ground terminal of the first inverter drive circuit is connected to the ground of the controller,
the first current sensor is isolated from the negative side of the second inverter circuit, and
the second current sensor is isolated from the negative side of the third inverter circuit.

12. An air conditioner comprising:
a first inverter circuit to drive a compressor;
a second inverter circuit to drive a fan;
a first inverter drive circuit to control switching of the first inverter circuit;
a second inverter drive circuit to control switching of the second inverter circuit; and
a controller to control the first inverter drive circuit based on a current flowing through the first inverter circuit, and to control the second inverter drive circuit based on a current flowing through the second inverter circuit, wherein
the first inverter drive circuit includes a control ground terminal and a drive ground terminal which are isolated from each other,
the control ground terminal is connected to a ground of the controller,
the drive ground terminal is connected to a negative side of the first inverter circuit, and
a ground terminal of the second inverter drive circuit is connected to the ground of the controller.

13. The air conditioner according to claim 12 comprising:
a current sensor to detect a current flowing through the negative side of the first inverter circuit;
a shunt resistance to detect a current flowing through a negative side of the second inverter circuit;

a first overcurrent detection circuit to detect an overcurrent of the first inverter circuit based on a current value detected by the current sensor;

a second overcurrent detection circuit to detect an overcurrent of the second inverter circuit based on a current value detected by the shunt resistance; and an instantaneous current detection circuit to detect an instantaneous value of a current flowing through the second inverter circuit based on a current value detected by the shunt resistance.

14. A ground connection method of an inverter device, the inverter device comprising:

a first inverter circuit;

a second inverter circuit;

a first inverter drive circuit to control switching of the first inverter circuit;

a second inverter drive circuit to control switching of the second inverter circuit; and a controller to control the first inverter drive circuit based on a current flowing through the first inverter circuit, and to control the second inverter drive circuit based on a current flowing through the second inverter circuit, wherein the first inverter drive circuit drives a load having a load current larger than that of the second inverter drive circuit, and a ground of the first inverter drive circuit and a ground of the second inverter drive circuit are connected to a ground of the controller through a path which does not contain a current path on a negative side of the first inverter circuit.

* * * * *